Inventor
Joseph P. Ruth.
By A. J. O'Brien
Attorney

Patented July 17, 1934

1,966,905

UNITED STATES PATENT OFFICE 1,966,905

BEARING

Joseph P. Ruth, Denver, Colo., assignor to The Ruth Company, Denver, Colo., a corporation of Colorado Application October 31, 1933, Serial No. 696,040

7 Claims. (Cl. 308—180)

This invention relates to improvements in roller bearings and has reference more particularly to an improved means for adjusting the several parts of the bearing to compensate for wear.

In places where heavy machinery is provided with roller bearings of the type usually referred to as "Timken" bearings, as, for example, railroad trains and locomotives, means is usually provided for tightening the bearings whenever this becomes necessary.

It is the object of this invention to produce an improved means for tightening bearings, of the type described, in such a way as to absolutely insure that the movable portion of the bearing shall be moved equally at every point in its circumference so as to assure that the adjustment will result in placing the movable bearing portion in a position exactly parallel to the one from which it was moved.

In the usual construction of bearings of the type to which this invention relates, the adjustment is effected by means of screws in such a way that it is practically impossible to determine whether every part of the bearing has been moved the same distance or not.

This invention can be most clearly explained and will be most readily understood when reference is had to the accompanying drawing in which it has been illustrated in its preferred form and in which:

Fig. 4 is a fragmentary section showing how the adjusting means can be reversed.

Figure 1:
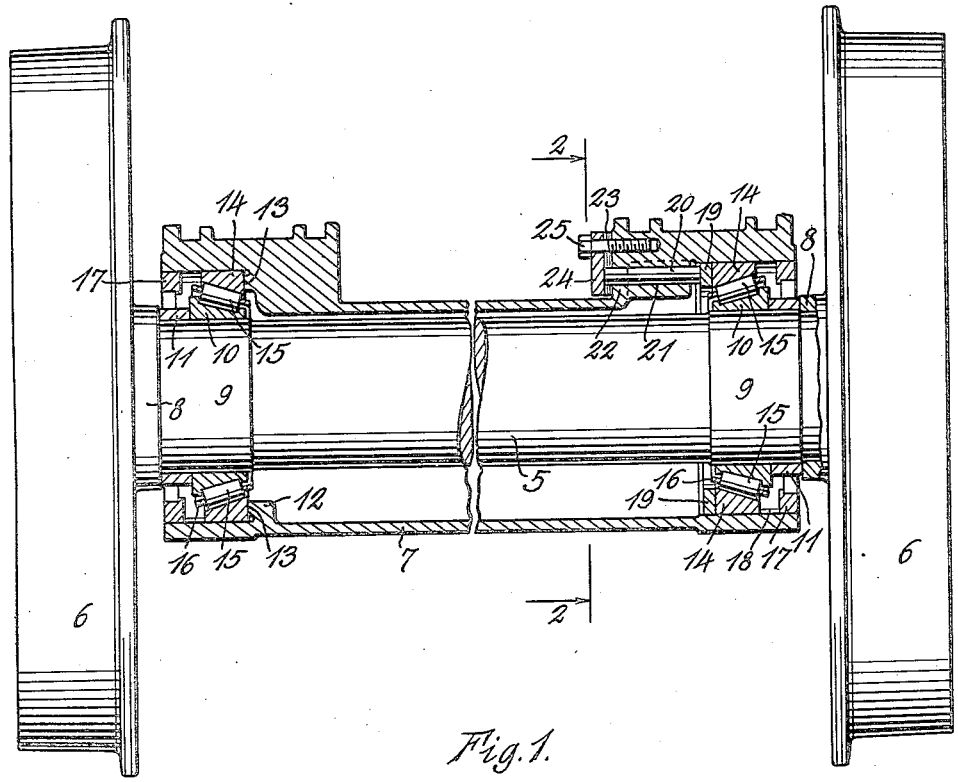
Fig. 1 is a longitudinal vertical section through an axial housing and the roller bearings contained therein and shows the means for adjusting or tightening the bearings.

In the drawing reference numeral 5 indicates the axle of a car such as a freight car or the axle of a locomotive and reference numerals 6 designate the wheels that are secured to the axle. The axle is usually enclosed in a housing 7 which extends the entire distance between the hubs 8 of the wheels. The axle is provided with two cylindrical surfaces 9 on which the cone portions 10 of the roller bearings are mounted. The cones 10 are held in position by means of rings 11 that in turn are held in position by the wheels as shown in the drawing. The housing is provided at one end with an inwardly extending flange 12 whose surface 13 is machined so as to lie in a plane perpendicular to the axis of the axle 5. The cup portion 14 of the bearing abuts the surface 13 as shown. The cup and the cone are separated by frusto-conical rollers 15 which are held in spaced relation by a suitable cage 16. A ring 17 is usually inserted in the open end of the housing so as to keep the oil in place and prevent, to some extent, the entrance of dust and dirt. The other end of the housing is provided with a cylindrical opening whose inner surface has been indicated by reference numeral 18. Instead of a stationary flange like that indicated by reference numeral 12, an annular member 19 is provided against which the cup 14 abuts. The cup 14 is held in properly adjusted position by means of a plurality of pins 20, three of these pins have been shown in this embodiment. Pins 20 extend through openings in the inwardly projecting lugs 21 and are slidable in the openings. The inner ends of the pins contact with one side of the ring 19 and the outer ends extend outwardly beyond the outer surface of the wall 22 a short distance. Surrounding the ends of the pins that extend beyond the wall 22 are a number of washer-like shims 23. A clamping plate 24 is located across the outer end of each pin and is secured to the housing by means of cap screws 25. The total thickness of the shims associate with each pin is just sufficient to fill the space between the outer surface of the wall 22 and the outer end of the pin when the cup 14 of the bearing is properly located and therefore when the cap screws are tightened, the pin will be held against outward movement and the bearing cup 14 properly located. Whenever the bearing has worn to such an extent that it must be tightened, this is accomplished by removing the same thickness of shim from each of the pins and then tightening the clamping plate 24, whereupon the pins will be moved inwardly exactly the same distance because the motion will be limited to the thickness of the shim removed and therefore by removing the same thickness of shim from each pin, the bearing cup 14 will be moved so as to lie exactly in a plane parallel to the one from which it was moved and this assures that a correct adjustment can be effected by merely using care in removing the proper thickness of shim.

In Fig. 4 a fragmentary section has been shown which is intended to illustrate how the adjusting means can be secured to the axle instead of to the housing, as this reversal of the arrangement shown in Fig. 1 may be useful where the housing is rotatable and the shaft stationary as sometimes occurs in different types of machines.

From the above description it will be apparent that by substituting pins 20 that are slidable in the openings 21 for the threaded pins usually employed and by surrounding the outer ends of the pins with a number of thin shims, the position of the bearing cup can easily be adjusted accurately by the simple expedient above described.

Figure 3:
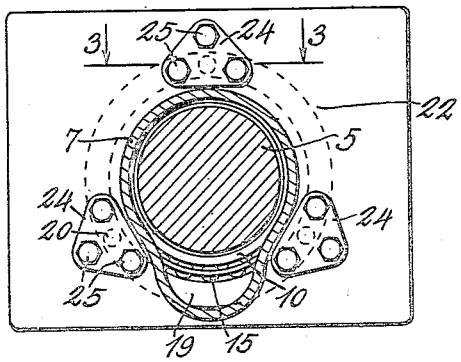
Fig. 3 is a section taken on line 3—3, Fig. 2.
Figure 3:
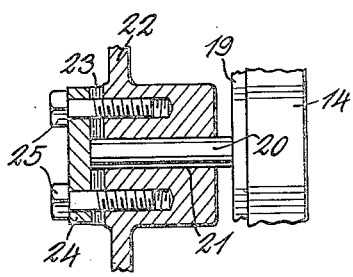
Figure 2:
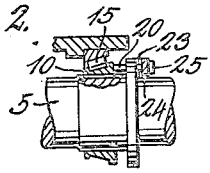
Fig. 2 is a section taken on line 2—2, Fig. 1.

It is, of course, possible to get the results pointed out above, by dispensing with the shims and replacing the pins by longer ones as can be clearly seen from Fig. 3 by assuming that the shims are part of the wall. In such a case the old pins are removed and replaced by others that are longer by the required amount, whereupon when the plate 24 is replaced, the cup 14 will be moved a distance equal to the increased length of the pin.

Having described the invention what is claimed as new is:

1. In a device of the class described, in combination, a supporting member, an annular member supported thereby and movable therealong, the supporting member having a wall that lies in a plane substantially perpendicular to its axis, the wall having a plurality of openings whose axes are parallel to each other and to the axis of the supporting member, a pin slidably mounted in each opening, the inner end of each pin serving as an abutment for the annular member, the outer ends of the pins extending beyond the outer surface of the wall, a plurality of washer-like shims surrounding the outer end of each pin, the total thickness of the shims being equal to the distance from the outer surface of the wall to the outer end of the pin when the annular member is held in proper operative position thereby, and a clamping plate extending across the outer end of each pin and secured to the wall by screws whereby the outer end of each pin will be held in the plane of the outer surface of the shims and whereby the annular member can be adjusted to another and parallel position by removing the same thickness of shim from about each pin and tightening the clamping plates.

2. In a roller bearing of the type in which the cup is slidably mounted in a cylindrical housing, means for moving the cup in the direction of its axis from one position to another position parallel therewith, said means comprising a plurality of pins which are mounted for longitudinal movement in openings in the housing, one end of each pin being positioned to serve as an abutment for the cup, the other end of each pin terminating outside of the wall of the housing, a number of shims surrounding the outer end of each pin and filling the space between the outer surface of the casing and the outer end of the pin when the bearing cup is held in proper operative position by the inner ends of the pins, and a clamping plate extending over the outer end of each pin and over the shims whereby the position of the inner ends of the pins can always be determined by the total thickness of the shims and whereby the several pins can be moved the same distance by removing the same thickness of shims from about the outer ends of each pin.

3. In a roller bearing of the type in which a cup is slidably mounted in a cylindrical housing, means for moving the cup in the direction of its axis from one position to another position parallel therewith, said means comprising a plurality of pins which are mounted for longitudinal movement in openings in the housing, one end of each pin being positioned to serve as an abutment for the cup, there being an abutment ring between the inner ends of the pins and the cup, the other end of each pin terminating outside of the wall of the housing, a number of shims surrounding the outer end of each pin and filling the space between the outer surface of the casing and the outer end of the pin when the bearing cup is held in proper operative position by the inner ends of the pins and a clamping plate extending over the outer end of each pin and over the shims whereby the position of the inner ends of the pins can always be determined by the total thickness of the shims and whereby the several pins can be moved the same distance by removing the same thickness of shims from about the outer ends of each pin.

4. In a bearing of the type in which a shaft extends through a housing having a cylindrical opening and in which a roller bearing comprising a cup and a cone separated by rollers is employed for producing an antifriction connection, the cup being slidably mounted in the cylindrical opening and the cone being nonmovably secured to the shaft, and in which the housing has a wall extending inwardly in overlapping relation with the cup, means for adjusting the position of the cup in the direction of the axis of the housing, said means comprising a plurality of pins slidably mounted in openings in the wall, the pins being angularly spaced about the axis of the housing, the inner ends of the pins serving as abutments for the cup and the outer ends extending beyond the outer surface of the wall, a plurality of washer-like shims surrounding the outer ends of the pins, the combined thickness of the shims in each case being equal to the distance from the outer surface of the wall to the outer end of the pin when the cup is held in properly adjusted position, and clamping plates extending across the outer ends of the pins and shims and secured to the wall by screws whereby the several pins can be moved exactly the same distance by removing the same thickness of shim from each and then tightening the screws holding the clamping plates.

5. A device for accurately adjusting the position of an annular member from one position to another and parallel position, comprising a support with which the annular member is slidably connected, an annular wall forming part of the support and overlapping the annular member, the wall having a plurality of openings angularly spaced about the axis of the annular member, pins extending through the openings, the pins being slidable in the openings and positioned to form abutments for the annular member, the other ends of the pins extending beyond the outer surface of the wall, washer-like shims surrounding the outer ends of the pin, the thickness of the shims being equal to the distance from the outer surface of the wall to the outer ends of the pins when the annular member is properly positioned and a clamping plate extending across the outer end of each pin and secured to the wall by means of screws whereby by removing an equal thickness of shim from about the ends of all of the pins and tightening the clamping plates, the annular ring will be moved a distance equal to the thickness of shims removed.

6. A bearing mounting having a tubular housing, a shaft extending through the same, bearings comprising each a cup portion, a cone portion and tapered rollers, interposed between the shaft and the housing, the cone portions being fixed to the shaft, there being two sets of spaced bearings, the cups of the bearings being supported by the housing, one of the cups being fixed and the other adjustable, means for adjusting the position of the adjustable cup, said means comprising pins that extend through the wall of the housing with their axes substantially parallel with the axis of the shaft, and means for holding the pins against longitudinal movement with their inner ends in position to function as an abutment for the adjustable cup, said last named means comprising a plate and means for securing the plate to the housing to serve as an abutment for the outer ends of the pins.

7. In a bearing mounting of the type in which there is an elongated housing through which a shaft extends, and in which the shaft is rotatably supported in the housing by means of two spaced roller bearings, each of which consists of a cone portion and a cup portion separated by frustoconical rollers whose axes converge towards the middle point of the shaft and intersect the axis of the shaft at a point and in which one cup portion is nonmovably connected with the housing while the other cup is longitudinally movable for the purpose of adjusting the bearing, means for effecting a longitudinal adjustment of the movable cup from one position to another and parallel position which comprises a plurality of pins which extend through the housing in a direction substantially parallel with the axis of the shaft and whose lengths are such that when the inner ends of the pins serve as an abutment for the cup the outer ends will be flush with an unyielding surface on the outside of the housing, and means for holding the pins in adjusted position, said means comprising clamping plates secured to the housing and engaging the outer ends of the pins to hold them in the plane of the outer surface of the wall surrounding the same.

JOSEPH P. RUTH.